J. W. COBURN.
REAR AXLE MOUNTING FOR TRACTORS.
APPLICATION FILED FEB. 26, 1918.

1,325,832.

Patented Dec. 23, 1919.

Inventor
JAMES W. COBURN

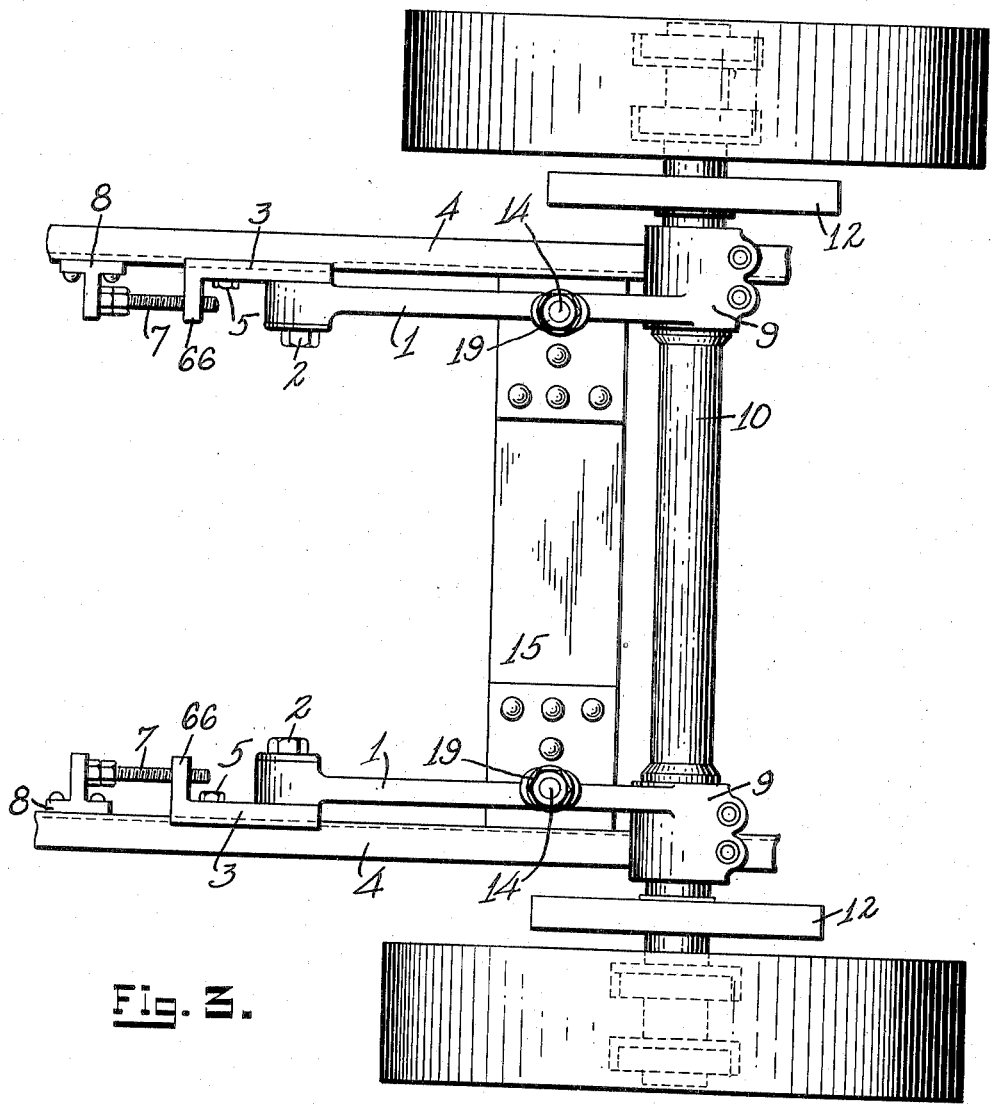

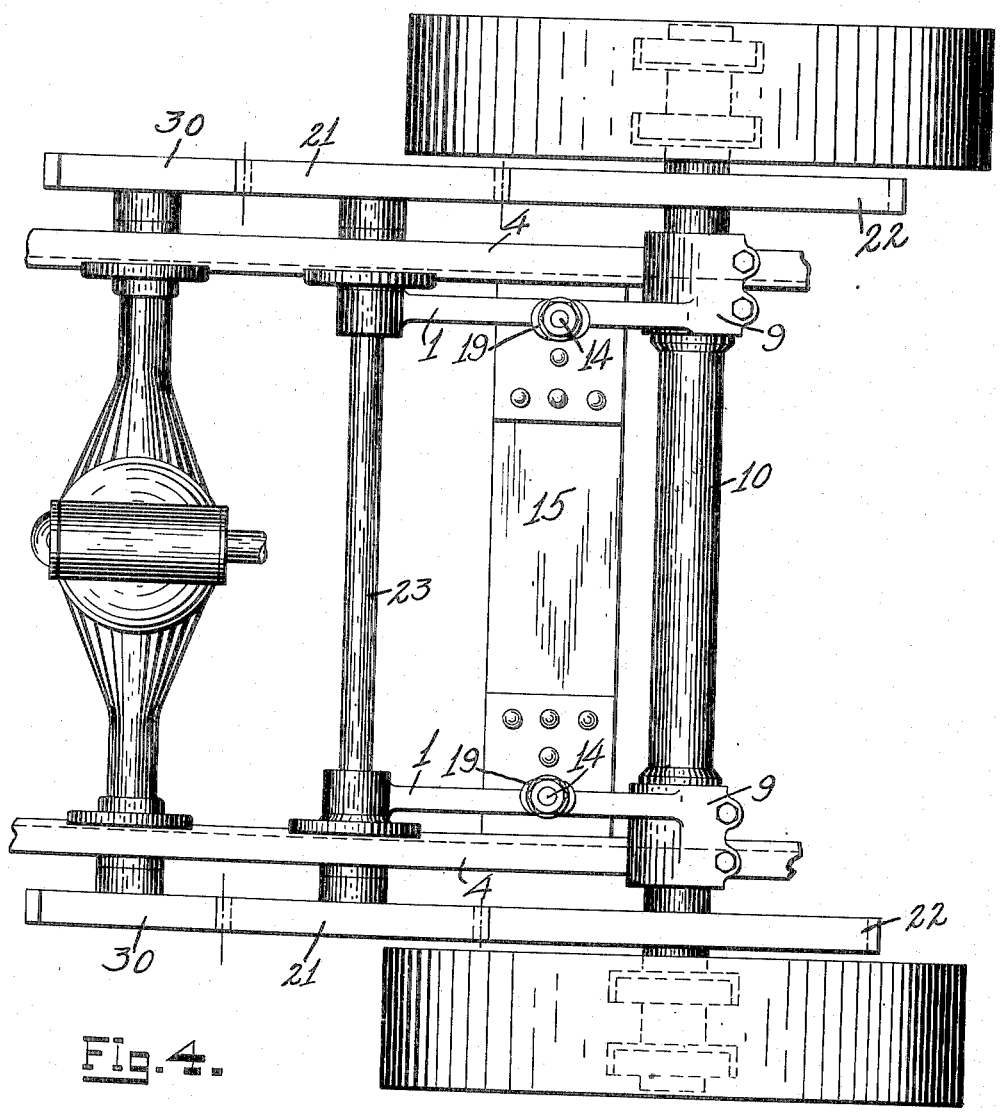

UNITED STATES PATENT OFFICE.

JAMES W. COBURN, OF HIGHLAND PARK, MICHIGAN.

REAR-AXLE MOUNTING FOR TRACTORS.

1,325,832.  Specification of Letters Patent.  Patented Dec. 23, 1919.

Application filed February 26, 1918. Serial No. 219,168.

*To all whom it may concern:*

Be it known that I, JAMES W. COBURN, a citizen of the United States, residing at Highland Park, county of Wayne, State of Michigan, have invented a certain new and useful Improvement in Rear-Axle Mountings for Tractors, and declare the following to be a full, clear, and exact description of the same, such as will enable others skilled in the art to which it pertains to make and use the same, reference being had to the accompanying drawings, which form a part of this specification.

This invention relates to rear axle mounting for tractors, and its principal object is to provide a mounting for a rear axle for tractors and the like that admits of vibration of the axle without consequential vibration of the frame of the vehicle, whereby shock incident to inequalities in the road surfaces are to a large extent prevented from transmission to the frame of the vehicle. A further object of the invention is to provide a spring suspension device in conjunction with side radius rods or levers attached to the axle and resiliently supporting the frame or body of the vehicle thereon, and in which one element of the spring-suspension arrangement will independently absorb the smaller shocks and another element coöperating therewith will absorb the greater shocks to which the wheels and axle may be subjected, and further to provide a spring arrangement to absorb what is known as the rebound shock. The side levers or radius rod arrangement being in pivotal relation with the framework to allow vertical movement between the frame and the axle. A further object of the invention is a radius rod and spring suspension device for vehicles adapted for use with chain or gear driven axles of which the several novel features of the invention in its preferred form are hereinafter more fully described and claimed and shown in the accompanying drawings in which—

Fig. 3 is a plan view of a rear axle showing the manner of supporting the radius rods to the frame in the chain driven type of vehicle.

Fig. 4 is a similar view showing the radius rod spring-suspension device of a gear driven vehicle.

Figure 1:
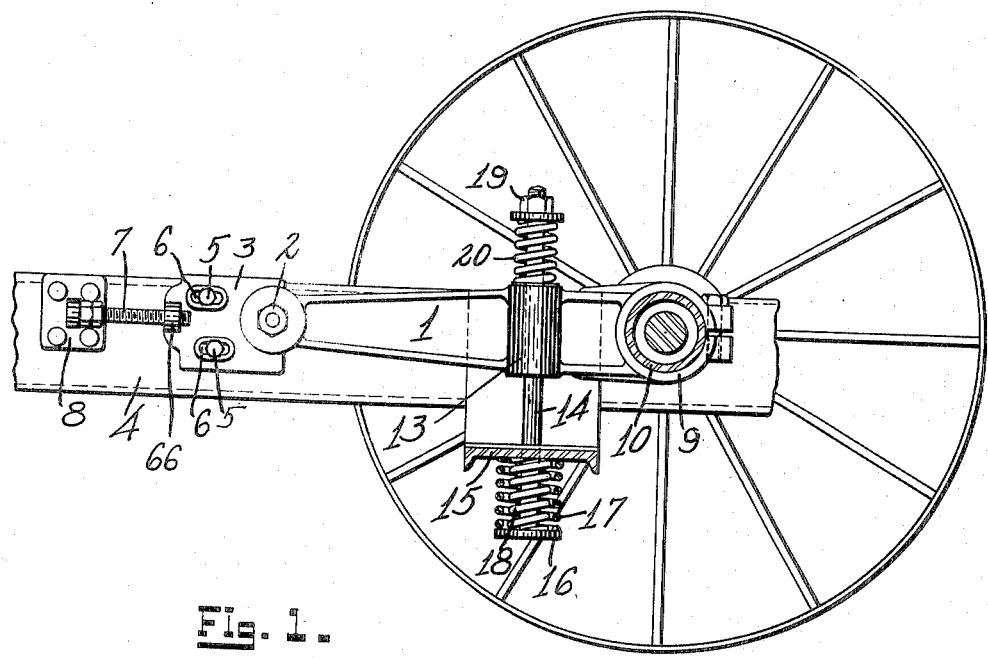
Figure 1 is an elevation partly in section showing my improved radius rod and spring-suspension device for axles.
Figure 2:
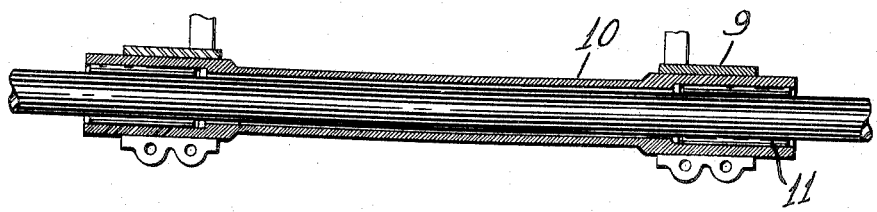
Fig. 2 is a longitudinal section of the axle housing showing a means of attaching the radius rods thereto.

In Fig. 1 is shown a radius rod 1 pivotally supported at 2 to a bracket 3 on the side frame 4 of the vehicle. This bracket is adjustable longitudinally of the framework, being secured to the framework by the bolts 5 passing through slots 6 in the bracket allowing for longitudinal movement of the bracket on the frame. The bracket is provided with a threaded lug 66 which is engaged by a bolt 7 passing through a stud on a bracket 8 fixedly secured to the framework. By means of the bolt 7 the bracket 3 may be moved longitudinally of the framework carrying therewith the radius rod and axle. The device described and shown in Fig. 1 is particularly useful in chain driven wheels and the longitudinal movement of the radius rod and bracket 3 is for the purpose of maintaining proper tension on the chain members (not here shown). The radius rod at the rear is provided with a split boxing 9 adapted to be clamped about the end of the axle housing 10. This housing extends from one wheel to the other as will be understood from Fig. 3, and roller bearings 11 support the axle in the housing. The housing is slightly spaced from the axle and provides a reservoir for semi-hardened lubricant by means of which the bearings may be maintained properly lubricated. As will be understood from Fig. 3 there is a radius rod attached to a bracket on each side frame of the vehicle and the wheels may be independently driven by a chain by means of sprockets 12 attached to the wheel hub in each instance, and one of the wheels should be keyed to the axle while the other wheel should be loose thereon. In the construction shown in Fig. 4 the wheels should be driven by a jack shaft containing a differential gearing. As shown in Fig. 1 the radius rod is provided with an enlarged bearing member 13 apertured to receive a vertical rod 14 passing therethrough. The rod also extends through a cross member 15 attached to the frame members 1 at each side. The shaft or bolt 14 is provided with a head 16 at the lower end providing a seat for a coiled spring 17 within which is a smaller coiled spring 18 encircling the rod and preferably the inner spring 18 is somewhat longer than the outer spring 17. Thus on rebound the inner spring is brought into action prior to the outer spring 17.

The rod extends upward through the housing 13 and at the upper end is provided with a flanged nut 19 between which and the upper face of the housing is interposed a spring 20. In the construction shown the springs 17 and 18 support the load of the frame as well as the spring 20. The spring 20 is preferably lighter in tension than the combined tension of the springs 17 and 18 thus all smaller shocks are absorbed by the spring 18 while the rebound shocks are properly absorbed by the spring 20.

In the form of construction shown in Fig. 3, the radius rods are made adjustable for the purpose of adjusting the length of the chain operating on the sprockets indicated at 12. The radius rod and tubular construction for supporting a rear axle to be utilized in a gear driven machine is shown in Fig. 4 on which the jack shaft is provided with a gear 30 on each end meshing with an identical gear 21 connected with the wheel after the same manner as the sprocket shown in Fig. 3. The radius rods instead of being pivotally connected with a bracket 3 as indicated in Fig. 3 are pivotally supported on a shaft 23 on which the idler sprockets 21 are mounted. The operation of the radius rods, however, is identical in either form of construction shown and in both instances the framework indicated at 4 passes beneath the rear axle and is unconnected therewith except through the radius rods and spring suspension thereof on the cross member 15.

By the construction shown, the rear axle is spring-supported through the radius rod construction which is pivotally connected to the framework allowing a vibration of the rear axle in a vertical plane without material distortion or movement of the vehicle frame supported thereby.

Having thus briefly described my invention, what I claim and desire to secure by Letters Patent of the United States is—

1. A suspension device for rear axles of vehicles comprising in combination with a vehicle frame and rear axle, of a tubular housing supporting the axle, a pair of spring supported radius rods each having an end attached near the ends respectively of the housing, a block slidably mounted on each side frame to which the opposite ends of the radius rods are respectively pivotally connected, a screw-threaded member engaging each block by which the same may be adjusted, and means for securing each block in its adjusted position.

2. A suspension device for rear axles of automotive vehicles consisting of the combination with a frame and axle of a vehicle, of a tubular member inclosing the axle provided with bearings therefor, the tubular member providing an oil receptacle for the said bearings, a radius rod secured near each end of the tubular member and pivotally connected with the adjacent frame member of the vehicle, a cross member of the frame extending beneath the radius rods, the radius rods having a vertical aperture therein, a shaft mounted in the said aperture and extending through the cross member of the frame, the shaft being provided with a head at each end, springs interposed between the head of the shaft and the lower side of the said cross member, and a spring on the said shaft between the upper face of the radius rod and the upper head thereof.

In testimony whereof I sign this specification.

JAMES W. COBURN.